No. 769,753. PATENTED SEPT. 13, 1904.
F. LOGE.
AUTOMATIC CURRYING MACHINE.
APPLICATION FILED JULY 1, 1903.
NO MODEL. 3 SHEETS—SHEET 1.

No. 769,753. PATENTED SEPT. 13, 1904.
F. LOGE.
AUTOMATIC CURRYING MACHINE.
APPLICATION FILED JULY 1, 1903.
NO MODEL. 3 SHEETS—SHEET 3.

Witnesses
Inventor
Frank Loge
by Geo. R. Hamlin
Attorney

No. 769,753. Patented September 13, 1904.

UNITED STATES PATENT OFFICE.

FRANK LOGE, OF EVANSVILLE, INDIANA.

AUTOMATIC CURRYING-MACHINE.

SPECIFICATION forming part of Letters Patent No. 769,753, dated September 13, 1904.

Application filed July 1, 1903. Serial No. 163,901. (No model.)

*To all whom it may concern:*

Be it known that I, FRANK LOGE, a citizen of the United States, residing at Evansville, county of Vanderburg, and State of Indiana, have invented certain new and useful Improvements in Automatic Currying-Machines, of which the following is a specification.

My invention relates to automatic currying-machines.

The object of the present invention is the provision of an improved and novel currying-machine for animals, which will be of few parts, simple construction, comparatively inexpensive, and adapted to accomplish the operation of currying a horse or other animal in an exceedingly short time as compared to the time usually required to perform this act by the usual hand-currycomb.

Further objects are to provide a machine which will thoroughly cleanse the skin to open the pores and remove the hair and dirt in such a manner that they will be confined and prevented from filling the air, which at present makes the currying operation unpleasant, and to render the work easy to perform.

With the foregoing objects in view the invention embodies an improved currycomb having rotary brushes, novel means for carrying off the dirt and hair by an air-suction, an improved device for catching and retaining the dirt and hair when thus removed, and other improved features, all of which are set forth in detail hereinafter and embodied in the appended claims.

Figure 1:
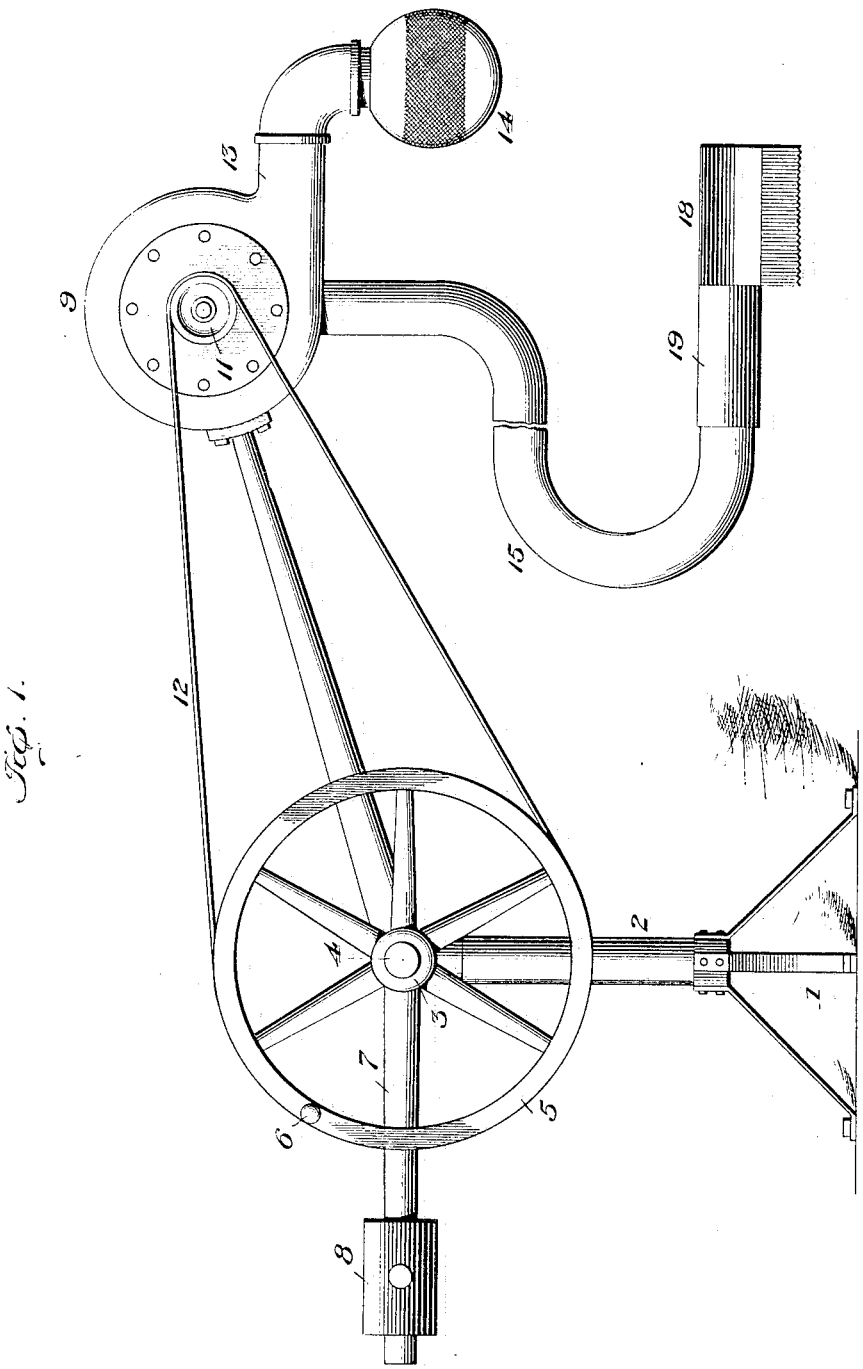
Figure 2:
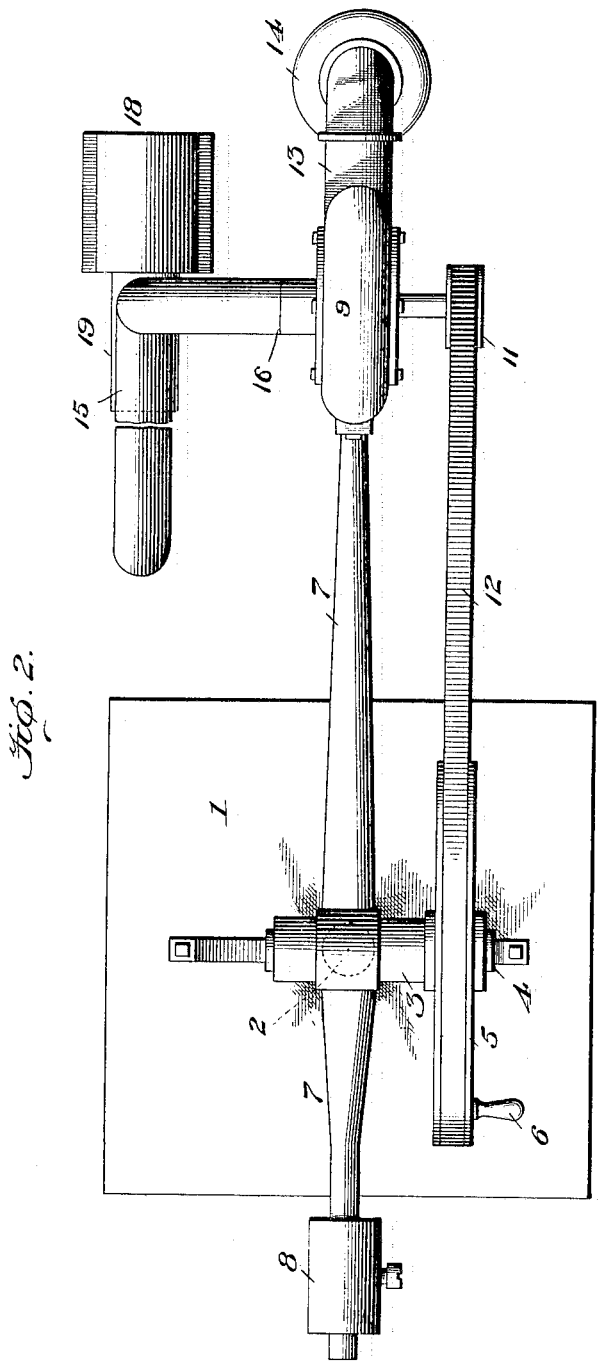
Figure 3:
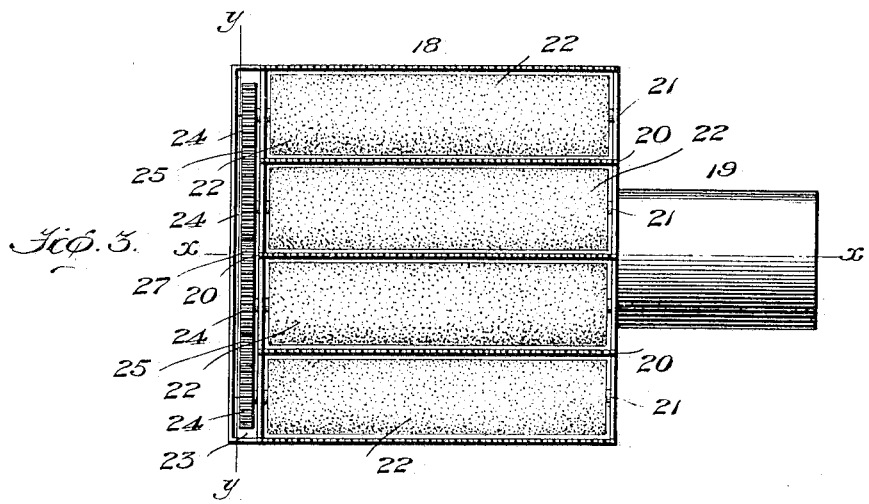
Figure 4:
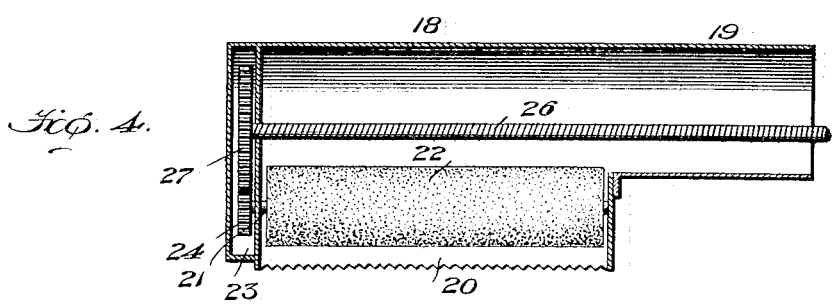
Figure 5:
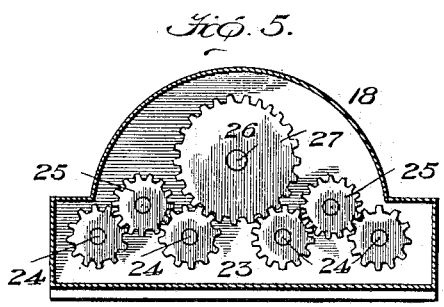
Figure 6:
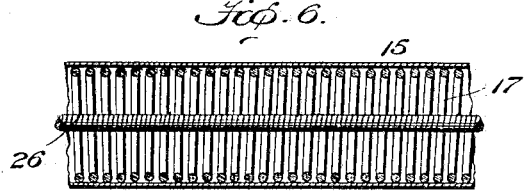

In the accompanying drawings, Figure 1 is a side elevation; Fig. 2, a plan view; Fig. 3, a bottom view of the currycomb; Fig. 4, a section on line *x x* of Fig. 3; Fig. 5, a section on line *y y* of Fig. 3, and Fig. 6 a detail of the flexible air-tubing.

There is a base 1, surmounted by a standard 2, having a rotary cross-bearing 3, in which shaft 4, carrying drive-wheel 5, is journaled, said drive-wheel having a suitable handle 6 to operate the same.

An arm 7, journaled on the cross-bearing 3, has an adjustable counterbalance 8 at one end, and at its other end is a completely-closed exhaust-fan casing 9, in which is a rotary fan 10, having a pulley 11 on its shaft, which is connected by belt 12 to the wheel 5. The casing 9 has a hollow coupling 13 connected to its hollow interior, to which a removable closed receptacle 14 is connected.

The numeral 15 designates a flexible hose, which has one end connected to the hollow coupling 16 at the side of the fan-casing 9. Inside this hose is a flexible or resilient coiled-wire lining 17, which keeps the hose dilated at all times to permit free passage of the air being drawn therethrough, thus preventing any "kinks" from occurring in the hose to cut off the air. At the free end of the hose is a currycomb 18, comprising a hollow casing having a hollow pipe-coupling 19, to which the hose 15 connects.

Fastened within the box-like casing 18 are separated parallel toothed or serrated bars 20, between which and journaled in the casing on spindles 21 are brushes 22. The casing has a compartment 23 at its end, and on the spindles 21 are gears 24, each pair of which are in mesh with idler-gears 25, journaled to the walls of the compartment.

Extending centrally of the hose 15 is a flexible shaft 26, coupled at one end to the shaft of the exhaust-fan 10 and at its other end journaled in the casing 18 and provided with a large gear 27, located in compartment 23 and meshing with the adjacent gears 24.

On turning the drive-wheel the rotary exhaust-fan is revolved, thus exhausting the air through the hose 15 and turning the flexible shaft 26, which rotates the brushes 22. As the currycomb is moved over the animal the bars 20 accomplish the currying action in the usual manner and the rotary brushes 22 spread the hairs and assist in the currying action, thus thoroughly cleansing the skin and opening the pores, so that all dead, diseased, and foreign matter is removed and a healthy condition of the skin insured. The exhaust-fan sucks the loosened dirt, hair, and other particles up through the hose and into the receptacle 14, thus confining the particles and obviating the usual foulness of the air incident to currying. The receptacle 14 can be removed at any time, thrown away, and a new receptacle substituted. The use of the flexible hose and rotary cross-bearing on the standard permits easy access to all parts of the animal being curried.

Having thus described my invention, what I claim as new, and desire to secure by Letters Patent, is—

1. In a currying-machine, the combination with a hollow casing, of a currying device carried by the casing, an air-suction device flexibly connected to said casing whereby particles loosened from the hide of the animal are drawn out of the casing, and a hand-operated motor for operating said air-suction device and said currying device.

2. In a currying-machine, the combination with a hollow casing, and fixed toothed currying-bars carried by said casing, of an air-suction device flexibly connected to said casing whereby particles loosened from the hide of the animal are drawn out of the casing, and a hand-operated motor for operating said air-suction device and said currying device.

3. In a currying-machine, the combination with a hollow casing and a rotary brush therein, of an air-suction device, a flexible hose connecting the air-suction device to the hollow casing, a flexible shaft within the hose and connected to the rotary brush, a hand-operated motor for operating the shaft to rotate the brush, said brush loosening the particles from the animal's hide and the air-suction device being adapted to draw the loosened particles from the casing.

4. A currycomb comprising a hollow hand-manipulated casing, a plurality of toothed currying-bars within the casing, a plurality of rotary brushes interposed between said toothed currying-bars within the casing and adapted to assist in the currying operation and brush up into the casing the particles loosened by the toothed currying-bars, a hand-operated motor for rotating the brushes independent of the manipulation of the casing, and air-suction means operated by said motor adapted to carry away the particles from the casing.

5. A currycomb comprising a hand-manipulated hollow casing, a stationary toothed currying device carried thereby, an operable currying device carried by the casing, a hand-operated motor for operating the operable currying device independently of the hand manipulation of the casing, and air-suction means for withdrawing the air and particles from the casing, said motor operating said air-suction means.

6. In a currying-machine, the combination with a hand-manipulated casing, fixed toothed currying-bars carried by said casing, and rotary brushes carried by said casing, of an air-suction device, a hose flexibly connecting said casing to the air-suction device, a flexible shaft within said hose and adapted to operate said brushes independently of the hand manipulation of the casing, and a hand-operated motor adapted to operate the rotary brushes, said motor also adapted to operate the air-suction device.

7. A currycomb comprising a casing, teeth within the casing, a rotary brush within the casing, and a motor for rotating said brush independently of the manipulation of the casing.

In testimony whereof I hereunto affix my signature in presence of two witnesses.

FRANK LOGE.

Witnesses:
    WILLIAM M. SMITH,
    GEO. H. HAHN.